United States Patent [19]

Schofield et al.

[11] 4,326,810
[45] Apr. 27, 1982

[54] MIXING DEVICES

[75] Inventors: Clive Schofield, Stevenage; John E. P. Miles, Buntingford, both of England

[73] Assignee: National Research Development Corporation, London, England

[21] Appl. No.: 29,907

[22] Filed: Apr. 13, 1979

Related U.S. Application Data

[63] Continuation of Ser. No. 847,493, Nov. 7, 1977, abandoned, which is a continuation of Ser. No. 636,958, Dec. 2, 1975, abandoned.

[30] Foreign Application Priority Data

Dec. 9, 1974 [GB] United Kingdom .............. 53108/74

[51] Int. Cl.³ .............................................. B01F 13/02
[52] U.S. Cl. ...................................... 366/106; 366/107
[58] Field of Search ................ 366/101, 106, 107, 177

[56] References Cited

U.S. PATENT DOCUMENTS

| | | | |
|---|---|---|---|
| 3,003,752 | 10/1961 | Frost | 366/106 |
| 3,097,828 | 7/1963 | Grün | 366/106 |
| 3,136,531 | 6/1964 | Wesselingh | 366/106 |
| 3,159,383 | 12/1964 | Van Munster | 366/107 |
| 3,648,985 | 3/1972 | Matweecha | 366/107 |
| 3,656,717 | 4/1972 | Klein et al. | 366/106 |

Primary Examiner—Philip R. Coe
Assistant Examiner—Timothy F. Simone
Attorney, Agent, or Firm—Cushman, Darby & Cushman

[57] ABSTRACT

A mixing and/or homogenizing device for use with powdered materials comprises a container with a number of jet nozzles or jet orifices located at or near the base of the container. Gas is supplied to groups of these nozzles or orifices in a predetermined sequence to promote a good mixing and/or homogenizing even with difficult materials. Various preferred modes of operation are described. A particularly important use of the invention is its application to cement manufacture.

8 Claims, 7 Drawing Figures

MIXING DEVICES

This is a continuation of application Ser. No. 847,493 filed Nov. 7, 1977, abandoned which is a continuation of Ser. No. 636,958, filed Dec. 2, 1975, now abandoned.

This invention relates to improved mixing devices and methods of mixing powdered solids.

It is known that solids can be mixed by wet processes and attempts have been made to evolve devices for the dry mixing of powdered solids. Thus, for instance, limestone and shale have been mixed in a container by fluidisation using air passing through diffuser nozzles or through a porous or sintered base consisting of tiles or segmented sections. These types of mixer have the disadvantage with certain finely divided cohesive materials, for instance 10-20 microns chalk and clay, that the bed of the mixture channels and hence no mixing or homogenisation occurs and on stopping the air-blast, the porous base tends to block. The blocking of the porous base may not be uniform so all of the air subsequently passes through the unevenly distributed unblocked area.

It has not been found that solid powders may be successfully mixed and homogenised in a suitable container by a gas passing through discrete jet nozzles or jet orifices arranged in regions at or near the base of the container if the regions of nozzles or orifices are activated independently in a predetermined sequence.

According to the invention, there is provided a mixing and/or homogenising device for use with powdered materials comprising a container having inlet and outlet means, a plurality of jet nozzles or jet orifices within the container and arranged in at least two regions at or near the base of the container, and means for supplying gas to the nozzles or orifices in each region in a controlled manner whereby the nozzles or orifices in each region can be activated independently in a predetermined sequence.

The invention also includes a process for mixing and/or homogenising powdered materials comprising loading the materials into a container and subjecting them to a gaseous discharge of at least 100 feet/second velocity from nozzles or orifices activated independently in a predetermined sequence.

By "jet nozzles" and "jet orifices" in this specification is meant nozzles or orifices which will discharge air at velocities of at least 100 feet per second, velocities in excess of 200 feet per second being preferred, for a supply of 8 cubic feet per minute to each jet nozzle or to each jet orifice as the case may be.

A jet nozzle may have more than one discharge aperture and in this case the velocity of the air discharged from each such aperture will be at least 100 ft per second for a supply flow to the nozzle as a whole of 8 cubic feet per minute. The term "jet orifices" is not to be interpreted as including these discharge apertures but is instead to be interpreted as defining orifices in a plate or like partition member from which air jets with a velocity of at least 100 feet per second are emitted at one side of the member in response to a supply flow to each orifice of 8 cubic feet per minute at the other side of the member.

The jet nozzles and jet orifices of the present invention contrast with the diffuser nozzles and diffuser bases referred to above where typically the same supply flow would result in discharge flows with velocities of less than 10 feet per second.

It is thought to be advantageous to have a time overlap (e.g. a second or less) between the activation of the nozzles or orifices in one region and the deactivation of the nozzles or orifices in the previous region in the sequence.

The total air flow through the container at any given amount should preferably be in the range of 5-20 cubic feet per minute per square foot of the base area of the container.

In a preferred embodiment, nozzles or orifices are arranged with some of them in an outer annular zone surrounding others arranged in one or more inner portions of the container. The nozzles or orifices in the outer zone may be actuated in sequence with the remaining nozzles or orifices in which case the outer zone and the inner portions it surrounds all comprise sequentially operable regions as referred to above. Alternatively, it is envisaged that there may be advantages in some applications in having the nozzles or orifices of the outer zone permanently in use during operation of the device in which case only the portions surrounded by this zone comprises the sequentially operable regions referred to above. This latter mode of operation is particularly suited to the general case where the sequentially operated regions comprise different sections of a second (inner) annulus surrounded by the annular zone.

Preferably, in the various embodiments of the invention, the gas is arranged to be supplied to the nozzles or orifices in each region through a valve means, and each valve means is opened in turn by a sequence timing device.

Preferably, each nozzle or orifice is arranged to be supplied with a reduced amount of gas when its valve means is not opened by the sequence timer.

Preferably, means are provided above the outlet of the device to aerate the powdered materials and conveniently this may consist of a ring containing nozzles. The outlet or outlets advantageously include an external conic section.

In one mode of operation raw material is continuously introduced into the top of the container and the mixed and/or homogenised material is continuously removed from the bottom of the container. It has been found advantageous to provide a modest aeration of the powdered material above the outlet during mixing and storage and to continue this aeration during discharge if the powder tends to block or arch across the outlet.

The material to be mixed should be sufficiently fine to be aeratable. The size range of the powder is not critical and materials of average size 10 microns have been mixed successfully.

One important application of the invention is its use in mixing cohesive materials i.e. particulate materials in which surface forces of attraction between the particles such as surface tension forces, van der Waals' forces, and like forces, are high enough to result in the material bridging across the open exit orifice of a hopper in which the material has been stored. Obviously bridging can be avoided by increasing the size of the orifice but the term 'cohesive' nevertheless usefully distinguishes from those particulate materials which will never bridge across an orifice, no matter how small it is, because of surface attraction forces in the material.

Amongst cohesive materials that have already been successfully mixed with the apparatus are finely divided chalk, clay or carbon, with a moisture content of not more than a few percent (e.g. "dry" chalk etc. with less than 1% moisture). By "finely divided" in this context is meant an average particle size of 10 microns or so. Recent test have also shown that the apparatus of the present invention is equally successful in mixing together finely divided chalk, clay and sand (silica) in proportions suitable for their subsequent use in cement manufacture.

The mixing device and method of the invention is especially suitable for homogenising batches of a mixture which have been prepared separately, in say a ball-mill or other comminuting device, and contain variable amounts of the constitutents. The efficiency of the mixer in this respect was measured by adding approximately 0.1 percent of sodium carbonate to a 3 ton mixture of carbon. After 45 minutes mixing, sampling showed that 95 percent of all 20 g portions from the system would contain between 0.11 and 0.15 percent of sodium carbonate.

During blending the air flow was approximately 13 cu. ft. per minute per square foot of active area with only one area active at a time and the pressure drop about 15 p.s.i. With the time sequence chosen, each area was aerated for 8 seconds and then quiescent for 24 seconds.

The mixing device may be operated discontinuously to give batches of material or continuously. In the latter case, it is convenient to introduce the raw material into the top of the container and to remove the homogenised mixed material from the bottom of the container by any known means, for instance a screw conveyor. It has been found that with certain mixtures, for instance chalk and clay, the homogenised mixture has a tendency to retain a certain amount of air which may make subsequent handling difficult. In these cases, the exit has been modified to include an external conic section to act as a de-aeration section. In some cases, the de-aeration given by the cone has been too efficient and preferably an aeration ring is inserted in the conical section to facilitate control of the discharge.

The rate of air flow is dependent on the properties of the materials to be mixed and the size of the mixer. The pressure drop is dependent on the nozzle design together with the above considerations.

It has been found advantageous to have an even distribution of the nozzles or orifices over the area of the base of the device e.g. approximately two nozzles per square foot has given satisfactory mixing.

For prolonged storage of cohesive materials, it is advantageous to effect a continuous aeration through the nozzles in all sectors at a rate lower than that required for blending to prevent compaction and blockage.

The efficiency of mixing of the device according to the invention has been investigated by measuring the pressures generated at the walls of the container by inserting a probe consisting of a number of rubber diaphragms with strain gauges bonded to them. The results obtained showed that the pressure profile was fairly close to that for a completely fluidised system. The materials mixed, powdered chalk and clay, could not be fluidised by the usual method employing a porous floor.

It will be appreciated from what has been written above that the invention includes within its scope powdered materials that have been mixed and/or homogenised with the device and/or method of the invention.

In particular the invention includes the specific materials hereinbefore mentioned as well as those discussed in the following examples.

Embodiments of the invention will now be described, by way of example only, with reference to the accompanying drawings in which.

Figure 1:
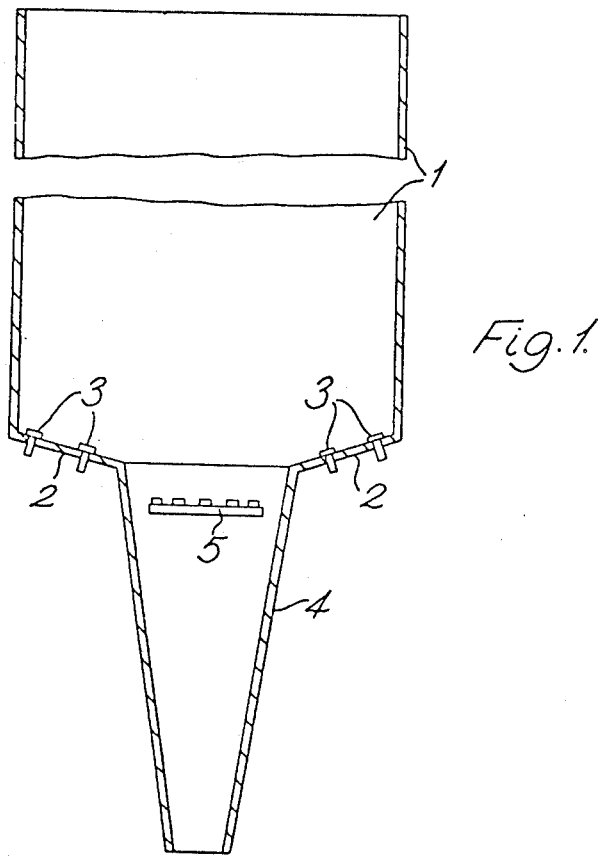
FIG. 1 is a vertical representation of a mixer.

FIG. 1 shows a vertical view of an open-ended mixer having a cylindrical container 1, 12 feet high and 5 feet in diameter. The base 2 containing the jet nozzles or jet orifices 3 is inclined at a small angle to the horizontal and contains a conical extension 4 having a cone angle of 80°, which acts as an exit for the mixed materials. A circular ring 5 containing nozzles or orifices through which a gas may pass is situated in the conical extension to assist the removal of the mixed and homogenised material.

Figure 2:
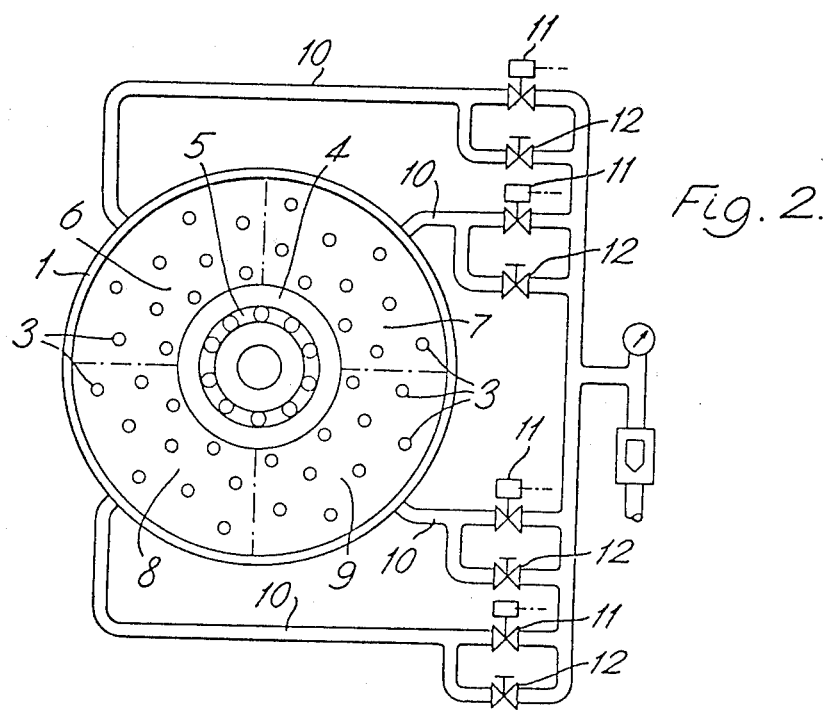
FIG. 2 is a plan view of the mixer of FIG. 1 showing the nozzle regions and air supply connections.

FIG. 2 shows a plan view of the lower section of the mixer of FIG. 1. The base 2 between the vertical wall of the container 1 and the conical extension 4 is divided into four sectors 6, 7, 8 and 9 each containing a plurality of nozzles 3. Air is supplied at 8 cubic feet per minute to the nozzles 3 in each sector by pipelines 10, containing solenoid valves 11 and by-pass valves 12. The nozzles in each sector are aerated in turn by a sequence timer (not shown) operating through the solenoid valves 11. It is convenient to allow a small quantity of air to pass continuously through the nozzles by means of by-pass valves 12, to ensure that the nozzles will not block and to keep the material in the quiescent sectors mildly aerated. The velocity of the air jets from the nozzles is about 250 feet per second. Such an apparatus of 3 tons capacity has been used for homogenising ground material consisting of 200 lb batches of chalk and clay with a between batch coefficient of variation of 10 percent in the content of one constituent. With a throughput of 3½ tons per hour, the outgoing coefficient of variation was 1.3 percent.

Figure 3:
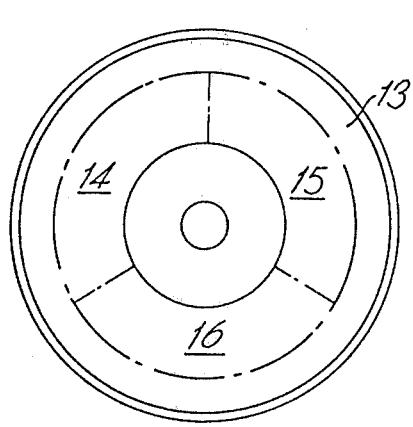
FIG. 3 is an alternative arrangement of the nozzle regions.
Figure 4:
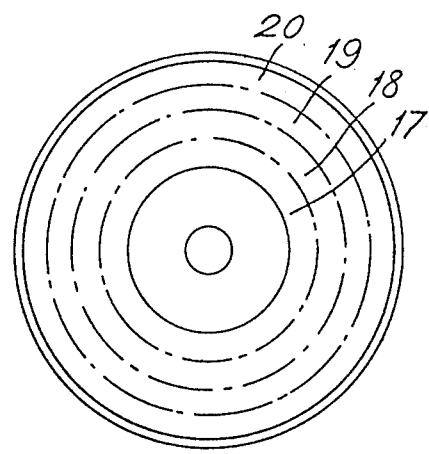
FIG. 4 is a further alternative arrangement of the nozzle regions.

FIGS. 3 and 4 show alternate geometrical arrangements of the regions of nozzles. FIG. 3 shows four regions 13, 14, 15 and 16 in which 13 consists of an outer annular zone and FIG. 4 shows three annular regions 17, 18, 19 and an outer annular zone 20. The exact position of the nozzles in the regions is not shown. The operational characteristics of these two embodiments are similar to that already described for the embodiment shown in FIG. 1.

Figure 5A:
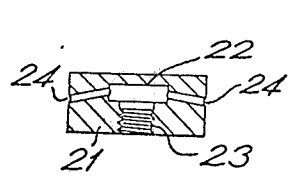
FIGS. 5a and 5b are an elevation and plan view of one type of jet nozzle for use in the mixer.
Figure 5B:
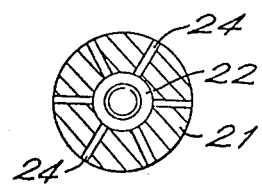

FIGS. 5a and 5b show elevation and views of one particular type of nozzle which may be used with the mixing device of FIG. 1. The nozzle consists of a cylindrical metal block 21 containing an internal chamber 22 connected by a threaded passage way 23 to one side of block 21. Six internal air passage ways 24 inclined downwards at an angle of 10° from the horizontal, lead from the internal chamber 22 to the outer periphery of the block 21. These blocks may be screwed by means of threaded passage way 23 to externally threaded pipes (not shown) connected to the air supply lines 10 (FIG. 2) projecting through the base 2 (FIG. 1) of the mixer.

Figure 6:
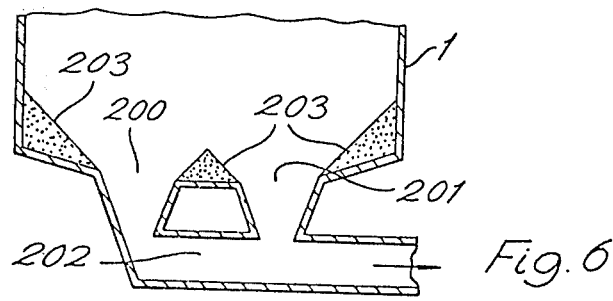
FIG. 6 is a discharge arrangement.

The embodiments of the invention which have been particularly described above have shown one outlet from the container. It may be advantageous to provide a plurality of outlets from the container, and, if required, to combine these outlets into a common discharge section. FIG. 6 shows one such case where four openings (of which only two, 200, 201 are seen) lead into a common discharge section 202 from which the material is extracted e.g. using an auger (not shown). The outlets are equally shared and preferably the combined area of the outlets is not greater than the area of the single outlets of the earlier embodiments. However, obviously no outlet should be so small that it is blocked by the material.

It will be appreciated that the "dead" volume of material 203 is less than it would be for a container with a single outlet of the same total area. Thus it has been found, for instance, that the efficiency of mixing may be increased by providing a plurality of outlet and, in consequence, the residence time of the materials to be mixed or homogenised may be increased.

We claim:

1. A process for mixing and/or homogenising finely divided cohesive materials having a tendency to channel comprising:
   loading the materials into a container having a base including at least one material outlet port and a number of individually distinctly directed nozzle air ways;
   supplying the container with an air flow;
   applying said air flow to said individually distinctly directed nozzle air ways;
   converting said air flow into a number of discrete discharges from respective air ways in the form of air jets each having a velocity of at least 100 feet per second and preferably 250 feet per second for each 8 cubic feet per minute supplied by the air flow at an overall rate of between 5 and 20 cubic feet per minute per square foot of base area;
   orienting the air ways to direct the discrete discharges downwardly towards and across the base and the outlet port in intersecting angularly spaced directions;
   independently producing said air discharges in a predetermined sequence; and
   mixing and/or homogenising the loaded materials with said discharges, whereby aeration of loaded materials adjacent the outlet port is provided to reduce cohesive blocking or bridging of the outlet port by the materials.

2. A process as claimed in claim 1 in which the total air flow through the container at any given moment is in the range of 5–20 cubic feet per minute per square foot of the base area of the container.

3. A process as claimed in claim 1 in which raw material is continuously loaded into the top of the container and the mixed and/or homogenised material is continuously removed from the bottom of the container.

4. A process as claimed in claim 1, wherein said air discharges are produced sequentially in an outer annular zone and in an inner portion surrounded by the annular zones.

5. A process as claimed in claim 1, wherein discharges are continuously produced in an outer annular zone and the sequentially produced discharges occur in an inner portion surrounded by the annular zone.

6. A process as claimed in claim 1, wherein a time overlap exists between one step in the predetermined sequence and the next preceding step.

7. A process as claimed in claim 6 in which the time overlap is a second or less.

8. A process for homogenising a mixture of separately prepared batches of finely divided cohesive materials having a tendency to channel by mutual attraction due to their small size comprising:
   loading the batches into a container having a base with a material outlet port and a number of individually distinctly directed nozzle air ways;
   supplying the container with an air flow; and
   converting said air flow into a number of discrete discharges in the form of air jets in the container individually directed from respective nozzle air ways downwardly towards and
   across the container base and the outlet port in intersecting directions, said air jets having a velocity of at least 100 feet per second for each 8 cubic feet per minute supplied by the air flow and occurring in a predetermined sequence to subject different regions of the mixture one after the other to said discharges, each region having its successive period of subjection to the discharges separated by a quiescent period, the discharge periods of adjacent regions being overlapped by one second or less.

* * * * *

UNITED STATES PATENT AND TRADEMARK OFFICE
CERTIFICATE OF CORRECTION

PATENT NO. : 4,326,810
DATED : April 27, 1982
INVENTOR(S) : Clive SCHOFIELD and John E.P. MILES It is certified that error appears in the above—identified patent and that said Letters Patent is hereby corrected as shown below:

The filing date of the parent application Serial No. 847,493 is in error on the front of the patent and in column 1. The correct filing date is:
November 1, 1977

Signed and Sealed this

Nineteenth Day of October 1982

[SEAL]

Attest:

Attesting Officer

GERALD J. MOSSINGHOFF

Commissioner of Patents and Trademarks